Figure 3:
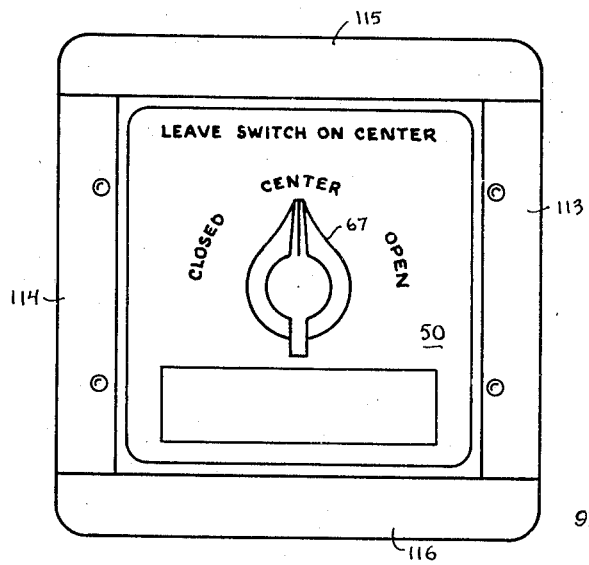

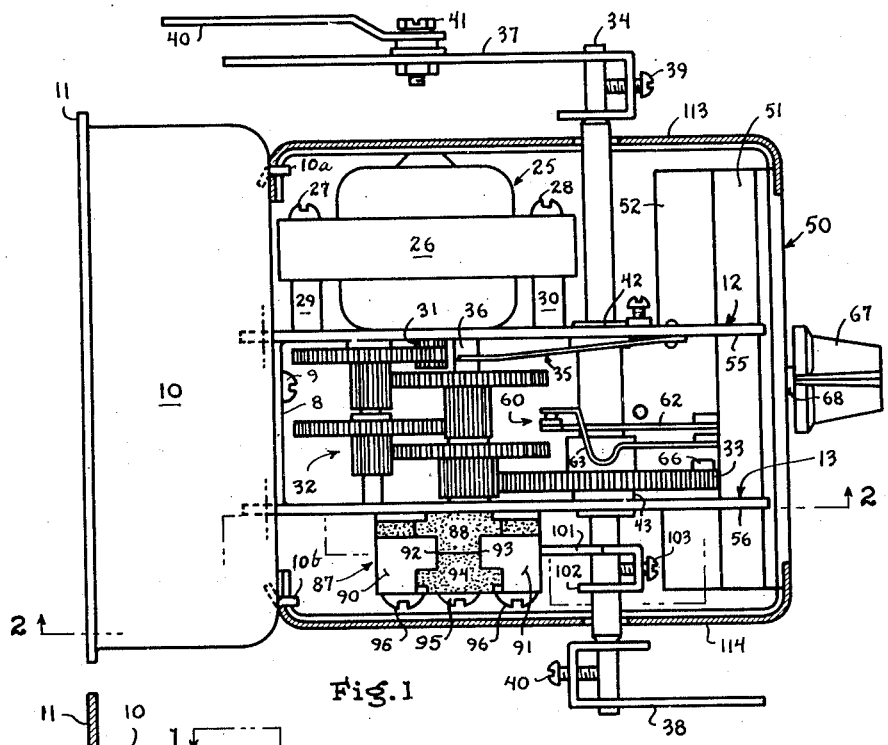

Aug. 10, 1943. S. C. SHIPLEY ET AL 2,326,692
MOTOR OPERATOR ASSEMBLY
Filed Jan. 20, 1940 3 Sheets-Sheet 2

Inventors
Sylvanus C. Shipley
Ward H. Ingersoll
Benjamin Cyr
By George H Fisher
Attorney Patented Aug. 10, 1943

2,326,692

UNITED STATES PATENT OFFICE 2,326,692

MOTOR OPERATOR ASSEMBLY

Sylvanus C. Shipley, Minneapolis, Ward H. Ingersoll, St. Paul, and Benjamin Cyr, Minneapolis, Minn., assignors to Minneapolis-Honeywell Regulator Company, Minneapolis, Minn., a corporation of Delaware Application January 20, 1940, Serial No. 314,862

13 Claims. (Cl. 172—36)

Our invention relates to motor operators for furnace dampers or the like and is concerned particularly with improvements in details of construction, arrangement of parts, and manner of assembly of such a motor operator.

Generally the object of our invention is to provide an improved motor operator having features offering the optimum in ease and efficiency of fabrication of parts and assembly thereof so as to promote economy of production.

Another object is to provide means for assembling a motor operator embodying a gear reduction train and control switches without the use of rivets, welding, or like fastening means.

Another object is to provide a damper motor assembly embodying a reduction gear train and a control panel having means for manual and automatic control, the parts being so structurally related that the entire unit can be assembled and disassembled substantially without tools.

Another object is to provide a motor operator assembly having its component parts retained in their proper relationship by hook and slot joints.

Another object is to provide a motor operator assembly comprising a frame and a control panel attachable thereto wherein all of the electrical terminals and contacts necessary for operation and control of the motor are mounted on the panel.

Another object is to provide the combination of a transformer housing mountable upon a wall and a motor operator assembly including a casing attachable to the transformer housing for mounting.

Another object is to provide a control panel having a manually operable switch arm cooperating with contact strips integrally with electrical terminals on the panel.

Another object is to provide an auxiliary switch in combination with a motor operator wherein a freely movable roller is interposed between the switch and its operating means.

Another object is to provide a damper motor operator and control means of the three wire type including a manual controller, a thermostat, and a limit controller, the wiring connections being such that the limit controller is in control when the motor operator has been operated in response to either the thermostat or the manual controller.

Another object of our invention is to minimize the number of parts necessary in a furnace damper motor operator assembly.

Another object is to provide a terminal panel attachable to a motor operator unit and having switch means forming part of the panel which are in a position to be actuated by the motor operator when the panel is attached thereto, so as to thereby eliminate the need of internal wiring for the switch means.

Another object of our invention is to provide novel and improved bearings and bearing supports for a rotatable shaft.

Another object is the provision of demountable shaft bearings which may be removably mounted in or attached to a frame or chassis without fastening means such as rivets, bolts or the like.

Figure 8:
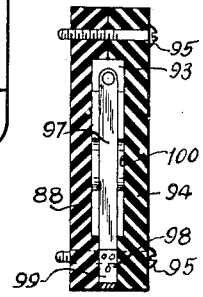
Figure 4:
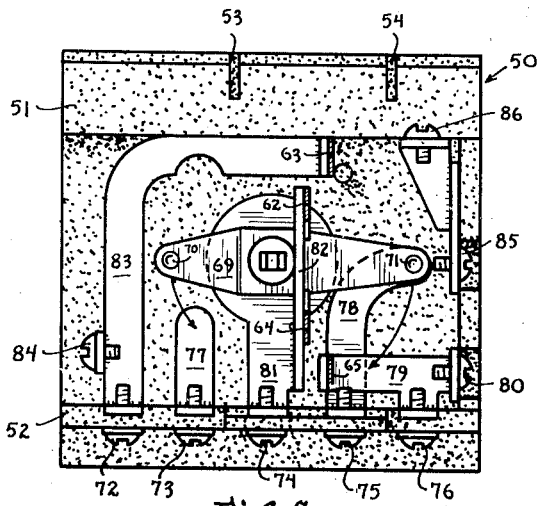
Figure 5:
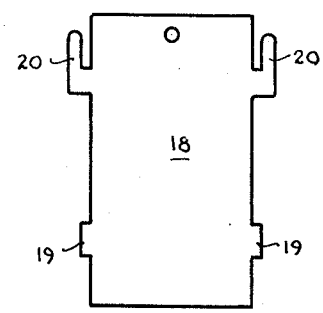
Figure 6:
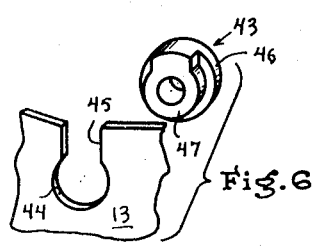
Figure 7:
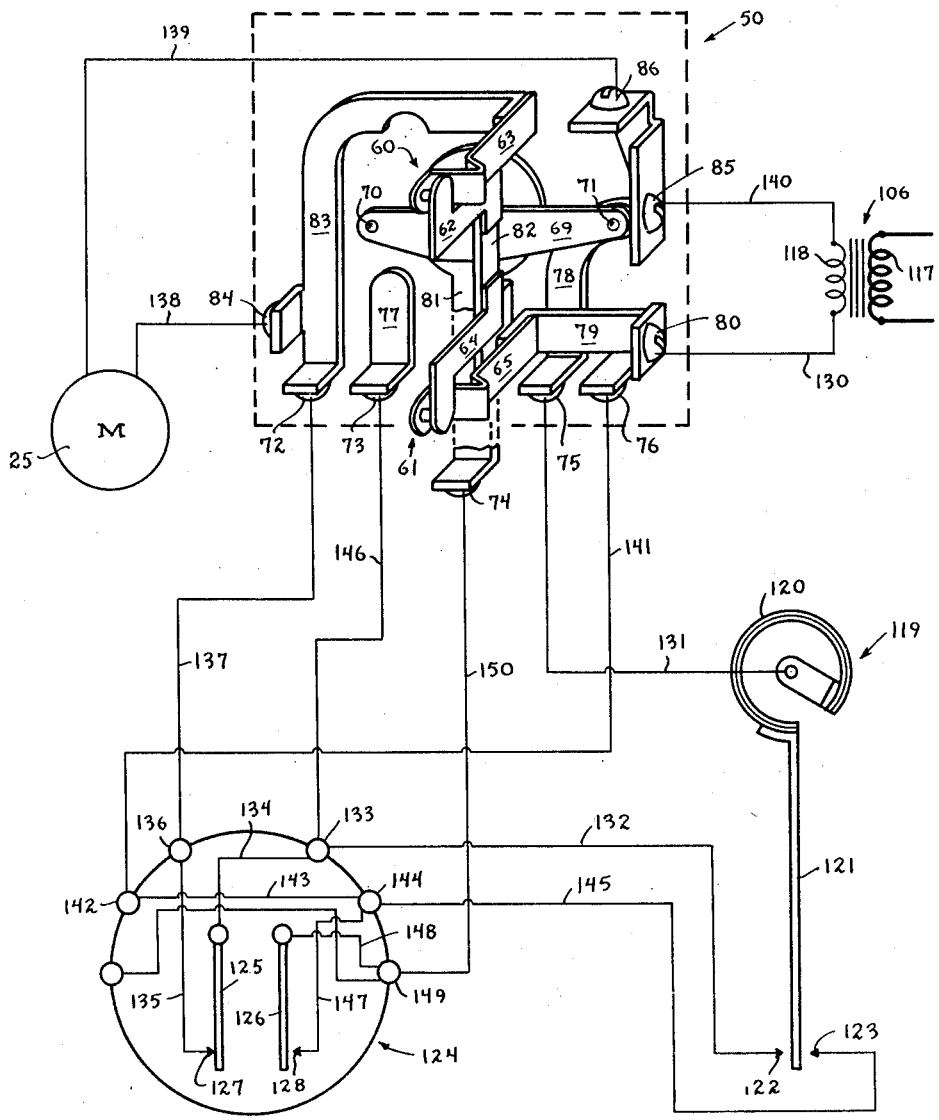

For a better understanding of our invention reference may be had to the following detailed description and annexed drawings wherein:

Figure 1 is an interior plan view of a complete damper motor assembly taken along line 1—1 of Figure 2, Figure 2 is a side elevation of the device of Figure 1, in cross section taken along line 2—2 of Figure 1, Figure 3 is a view of the control panel as seen from the right on Figure 1 with the panel rotated clockwise through 90°, Figure 4 is a view of the underneath or opposite side of the panel as shown in Figure 3, Figure 5 is a detail view of a part of the frame assembly, Figure 6 is a detail view of a shaft bearing and bearing mounting, and Figure 7 is a diagrammatic illustration showing the contacts and terminals of the control panel of Figure 3 in perspective and the circuit arrangements including the motor, transformer, thermostat, and limit controller, and Figure 8 is a sectional view of an auxiliary switch taken along the lines 8—8 of Figure 2.

Referring to Figure 1 of the drawings, this figure shows the motor operator assembly including a transformer, the assembly being shown in the position in which it would be in when mounted on a vertical wall in a manner to operate the chains or other connections of the dampers of a furnace. Numeral 10 designates the base of the assembly within which is located a transformer as will presently be described, the base 10 having a flange 11 which is attached to a vertical wall. The frame of the motor assembly is comprised of two spaced plate members 12 and 13 correspondingly shaped, these plates being joined by an integral transverse portion 8 secured to base 10 by a screw 9. The shape of these plates may be readily ascertained by viewing the plate 13 on Figure 2. The base 10 forms a generally rectangular housing having a pair of slotted openings for each of the plates 12 and 13 these openings for plate 13 being designated 14 and 15 on Figure 2. Each of the plates 12 and 13 has a pair of tongues or fingers, these tongues being designated 16 and 17 on plate 13 in Figure 2, and they are arranged to extend through the slotted openings 14 and 15 in the base or housing 10. It will be noted that the opening 14 is of a greater extent than the opening 15 and the tongue 16 has an extending portion so that this tongue and the opening 14 form a hook and slot joint, so that when the plate 13 is in the position shown with respect to the base 10 the tongue 17 will just engage the opening 15. The material of the frame has enough resiliency to permit a small amount of spreading of plates 12 and 13 and normally the plates are retained in their proper spaced relation by means of a plate 18 (see Figure 5) arranged transversely to the plates 12 and 13. The plate 18 has tongues 19—19 and 20—20 on its opposite edges, the tongues 20 having extending portions which form hook and slot joints with corresponding openings in the plates 12 and 13, the opening of plate 13 referred to being designated 21 on Figure 2. The plates 12 and 13 also have corresponding openings engageable by the tongues 19—19, the numeral 22 designating this opening in the plate 13. When the plates 12 and 13 are spread apart slightly from their normal positions the plate 18 can be put in its position with its tongues engaging their respective openings in the plates 12 and 13 and then by moving plate 18 to the right looking at Figure 2, the extending portions of the tongues 20—20 will grip the outside of the plates 12 and 13 beyond the openings 21. Thus the plate 18 securely locks the plates 12 and 13 in their proper relative positions.

Numeral 25 designates generally an electric motor having a frame 26 which is secured to the plate 12 by means of screws 27 and 28 extending through suitable spacing members 29 and 30. The electric motor itself is of a known type and has a pinion gear 31 on its shaft which drives a train of reduction gears designated generally at 32, the reduction gears being mounted on shafts the ends of which are journalled in the plates 12 and 13. The last gear of the reduction gear train designated 33 is mounted upon a shaft 34 so as to drive the said shaft. Numeral 35 designates a brake mechanism for limiting coasting of the motor and gear train after the motor is deenergized, this mechanism comprising a resilient blade as shown, adjustable by a set screw and having a forked end engaging a flat sided collar 36 on one of the shafts journalled in side plates 12 and 13. Collar 36 is urged against a gear near the high speed end of the gear train and the friction acts as a brake to reduce coasting of the motor.

It will be noted that the shaft 34 extends all the way through the plate members 12 and 13 and exteriorly of the housing of the motor assembly which will be described later. At the ends of the shaft 34 are mounted operating arms 37 and 38, these arms having their ends bent back into a U-shape and being drilled to receive the ends of the shaft 34 and having set screws 39 and 40 passing through the U-shaped portions so as to rigidly secure the arms to the shaft. The arm 37 may have an extension 40 as shown suitably fastened thereto by means of a bolt 41 and spacing washers.

The shaft 34 passes through bearings 42 and 43 mounted in the plates 12 and 13, respectively. The bearing 43 and the manner of its mounting is shown in detail in Figure 6 which also shows a small portion of the plate 13. Referring to Figure 6 it will be noted that the plate 13 has a rounded opening 44 which is connected to the edge of the plate by a slot 45. The position of the opening 44 and slot 45 may be readily ascertained by noting slot 45 of plate 13 as shown on Figure 2. The bearing 43 comprises a circular portion 46 and another partly circular portion 47 of slightly smaller diameter and so shaped as to fit into the opening 44 and slot 45, the circular portion 46 then acting as a flange engaging one side of the plate 13. Thus it will be seen that when the bearing 42 is fitted into the opening 44 and slot 45 the bearing is then not free to rotate or to be moved vertically. Thus in assembling the shaft, bearings, and frame, the plates 12 and 13 are spread apart slightly, and with the bearings on the shaft, it is moved down through the slots corresponding to the slot 45 in plate 13 until the bearings 42 and 43 are opposite their respective openings. The plates 12 and 13 can then be drawn together until the bearings 42 and 43 are fitted into their respective openings and the plate 18 then locked into position. After the parts have been so assembled it will be seen that the bearings are locked in position thereby retaining the shaft 34 in its proper position and likewise the plates 12 and 13 are retained in position by the plate 18 so that the assembly as so far described is securely held together in its proper relationship in all respects without rivets or bolts or other fastening means of that type. Furthermore the assembly as so far described can be made without the use of tools of any kind and likewise to disassemble requires no tools.

Referring now to Figures 1, 2, 3, and 4, numeral 50 designates a control and terminal panel which may be made of Bakelite or other suitable composition material. The panel 50 is generally rectangular and has depending web portions 51 and 52, the depending web portion 51 having a pair of grooves 53 and 54 spaced the same distance apart as the plates 12 and 13. The plates 12 and 13 have tongues 55 and 56, respectively, which are adapted to be received in the grooves 53 and 54 of panel 50 (see Figure 4). The depending web portion 52 is secured to the plate 18 by a single screw 57 when the panel 50 is in position. The screw prevents leftward movement of plate 18, as seen in Figure 2, thereby preventing the unlocking of plate 18 from side plates 12 and 13. Similarly screw 57 prevents downward movement of panel 50, as seen in Figure 2, which movement is necessary to free the panel from tongues 55 and 56 due to their shape the grooves 53 and 54 being configurated to cause tongues 55 and 56 to hook them. The panel 50 has a pair of switches designated generally 60 and 61 depending therefrom, these switches being shown in broken lines on Figure 2, and the switch 60 being shown in full lines on Figure 1. The switch 60 comprises a pair of depending contact blades 62 and 63 carrying contacts adapted to engage with each other. The switch 61 comprises a pair of depending contact blades 64 and 65 carrying contacts adapted to engage with each other. The blades 63 and 65 are bent as may best be seen by viewing the arm 63 of Figure 1, so that these blades can be engaged by an insulated lug 66 on gear 33 for purposes of actuating these blades whereby to operate the switches 60 and 61. It will be understood that the switches 60 and 61 form limit control switches to limit the amount of rotation of the motor 25. Motor 25 is of the type which always operates in the same direction when energized, its operation being terminated by one of the limit switches after each 180° of movement and when again energized the circuit being through the other limit switch. When the panel 50 is in position the switches 60 and 61 depend on opposite sides of the shaft 34 in position to be actuatable by the lug 66 as stated above, on gear 33.

Figure 3 shows the exterior side of the panel 50, and Figure 4 shows the underneath side of the panel. Numeral 67 designates a manual operating knob mounted on a spindle 68 extending through the panel 50 and secured to a switch blade 69 by any suitable means so that the switch blade is rotatable by the manual knob. The switch blade 69 has a contact 70 at its left end and a contact 71 at its right end (see Figure 4). The web 52 of panel 50 has a plurality of electrical terminals 72, 73, 74, 75, and 76 these terminals being of a type including a screw for attaching an electrical connection to the terminal. Forming part of the terminals 73 and 75 are contact strips 77 and 78 imbedded in the Bakelite material, and which are adapted to be engaged by the contacts 70 and 71, respectively. When the manual knob 67 is in the position indicated Center on Figure 3 the switch blade 69 is in the position as shown in Figure 4. When the manual knob 67 is turned to the position marked Open in Figure 3 the contact 70 is moved into engagement with the contact strip 77 and the contact 71 is moved out of engagement with the contact strip 78. When the manual knob 67 is moved to the position marked Closed on Figure 3 the contact 71 is moved out of engagement with the strip 78 and into engagement with another contact strip 79, the switch blade 69 moving in a clockwise direction as seen on Figure 4. The contact strip 79 forms part of blade 65 of limit switch 61, part of terminal 76, and also part of another electrical terminal 80 as seen on Figure 4. Numeral 81 designates a contact strip or plate forming part of the terminal 74, this contact strip 81 including a portion through which the spindle 68 extends and which is continuously in electrical contact with the switch blade 69. The contact strip 81 also includes depending extension 82 to which are attached the blades 62 and 64 of limit switches of limit switches 60 and 61. Numeral 83 designates a contact strip forming part of terminal 72 and with which is attached one blade 63 of the limit switch 60. In addition to the terminals so far described there is a terminal 84 connected to the contact strip 83 and connected terminals 85 and 86 at one corner of the panel 50.

In connection with the foregoing description of the contacting mechanism and electrical terminals of the panel 50 it is pointed out that the purpose of the terminals and contacting mechanism is to provide for electrical wiring arrangements whereby the motor operator assembly can be controlled from a thermostat or the like of the three wire type or from the manual knob 67 or from a limit controller. The arrangement of the wiring connections and the various circuits of the motor and assembly are shown in Figure 7 which will presently be described. It is to be understood that the purpose of the manual knob 67 and its associated switching mechanism is to manually control the motor for the purpose of closing the furnace dampers, for example when it is desired to bank the fire. Thus normally the manual knob 67 is in the center position and the motor operator is under automatic control of the thermostat. In practice the wiring circuits are arranged so that upon turning the manual knob 67 to the position marked Open the motor operator operates in a direction to open the furnace dampers and turning the knob 67 to the position marked Closed causes the motor operator to operate in a direction to close the dampers.

Referring to Figures 1, 2 and 8 numeral 87 designates generally an auxiliary switch mounted on the plate 13 and arranged to be operated by the motor operator. The switch 87 comprises two identical halves which when put together form a housing for the switching members. Numeral 88 designates one of these halves which may be formed of Bakelite or other suitable composition. The inner side of each of the halves has a depressed or recessed portion of the shape indicated at 89 in Figure 2. Numerals 90 and 91 designate angular contact brackets arranged at the corners of the auxiliary switch, these contact brackets having portions designated 92 and 93 which are disposed in suitable grooves in the Bakelite portion of the switch housing, it being understood that portions 92 and 93 fit into corresponding grooves in both halves of the switch housing. The other corresponding half of the switch housing is designated at 94 and as may be seen in Figure 1, when this half is superimposed on the half 88, the portions 92 and 93 of brackets 90 and 91 extend through the Bakelite and into the interior of the housing. The half 94 may be secured to the half 88 by means of screws 95 extending through suitable openings and into threaded engagement with the plate 13. The contact brackets 92 and 93 carry contact members adapted to engage with contacts on the end of a contact blade 97. The contact blade 97 has its opposite end engaged in a groove in the Bakelite material of both halves of the housing in the same manner that portions 92 and 93 of brackets 90 and 91 engage in corresponding grooves in both halves of the Bakelite housing. Engaged in the same groove as the end of the contact strip 91 is a portion 98 of a contact bracket 99 similar to the brackets 90 and 91. Contact brackets 90, 91 and 99 each carry a suitable terminal screw 96. Numeral 100 designates a fibre disc which is circular in shape and adapted to fit into a circular portion of the recesses in the corresponding halves 88 and 94 of the Bakelite switch housing. In other words, when the half 94 of the switch housing is superimposed on the half 88 the fibre disc 100 will fit into a circular portion of the recess in the half 94 corresponding to the recess 89 in the half 88. The recesses in the corresponding halves of the switch housing extend to the edge of the Bakelite material so that when the auxiliary switch is assembled the fibre disc 100 extends beyond the edge of the Bakelite and can be moved in a direction to actuate the contact blade 97 and operate the contacts associated therewith. For operating the auxiliary switch there is a cam 101 of semi-circular shape arranged to engage the fibre disc 100, the cam 101 having a collar 102 which is secured to the shaft 34 by means of a set screw 103. Whenever the cam 101 is in engagement with the fibre disc 100 the contact blade 97 is in one of its positions and when the cam 101 is moved in one direction or the other to such an extent that its surface is moved out of engagement with the fibre disc 100, the contact blade 97 moves to its other position.

Thus, when our operator assembly is provided with an auxiliary switch 87, the assembly may be used in a dual control system in which an auxiliary three-wire device, which may, for example, be another operator assembly such as the one described herein, is controlled by the switch and immediately set into operation following operation of the main assembly.

Within the base portion 10 as has been previously stated is mounted a transformer generally designated 106. As seen on Figure 2 the transformer 106 comprises a plate or support 107 to which the transformer core 110 is fastened by means of suitable screws 108 and 109, there being suitable brackets and spacing members to space the transformer core from the plate 107. The transformer windings are covered by a protective shield 111 and connections are made to the transformer by means of a plurality of terminals comprised of screws corresponding to the screw 109. The plate 107 has a bent in flange portion 112 which has an opening to permit electrical leads to be extended upwardly therethrough, and through a corresponding opening in the housing 10.

The motor operator assembly other than the transformer and housing 10 is enclosed within a housing comprised of four side plates designated 113, 114, 115 and 116. (Figures 1 and 2). The side plates 113 and 114 have tongues which engage in suitable openings in flanges 10a and 10b, respectively forming part of the base 10 and have bent over portions at their opposite edges which are arranged to grip the panel 50. (See Figures 1 and 3). After the side plates 113 and 114 are in position as shown in Figure 1 the plates 115 and 116 are put in position on the opposite sides of the assembly. The plates 115 and 116 are dished, or, that is, they have a continuous flange around their edges arranged to fit over the edges of the plates 113 and 114 and the panel 50 in the manner of a cover. (See Figure 3.) The plates 113 and 114 have projections which lock with the plates 115 and 116 when the parts have been assembled so as to securely retain the various elements of the housing in properly closing relationship.

From the foregoing it will be understood that when our improved operator assembly is used to operate furnace damper chains or the like the base portion 10 is mounted on a wall or the like with the motor operator assembly in the position as shown in Figure 2. The necessary electrical wiring may then be carried through the base 10 to the transformer and to the interior of the operator housing, it being understood that all of the terminals on the panel 50 described in connection with Figure 4 are within the motor operator housing. The entire assembly therefore presents a neat and attractive appearance with the manual operating knob 67 in an easily visible and available position.

Referring to Figure 7 of the drawings, the control panel 50 is shown diagrammatically in perspective so as to more clearly disclose the relative positions and operation of the various switch members and contacts. The motor is shown at 25 and the transformer 106 is diagrammatically shown as having a primary winding 117 and a secondary winding 118. In addition to the motor and transformer there is shown a thermostat 119 of the double contact type, this thermostat comprising a bimetal element 120 arranged to actuate a movable switch blade 121 which engages with a fixed electrical contact 122 upon a drop in temperature to a predetermined value, and which engages a fixed contact 123 upon a rise in temperature to a predetermined higher value which may be one or two degrees higher, for example. Numeral 124 designates a limit controller of a known type which may be placed in the bonnet or stack of a furnace or boiler, the drafts of which are operated by the damper motor assembly of our invention and which is controlled by the thermostat 119. The limit controller 124 includes a pair of switch blades 125 and 126 cooperating with fixed electrical contacts 127 and 128, respectively. Both of these switch blades are operated by a thermostatic element which is of a known type and which is usually of helical form and is usually located as mentioned above so as to be responsive to bonnet or stack temperature. The switch arm 125 engages the contact 127 upon a fall in temperature and normally this switch is closed. Upon a rise in temperature to a predetermined relatively high value, the switch arm 125 disengages from its associated contact, and the switch arm 126 engages its associated contact, it being understood that these switches act in a known manner as a limit control.

With the circuit arrangement which I have shown in Figure 7 the thermostat may cause the damper motor to operate to either open or closed position of the draft damper of the furnace or boiler, it being understood that when the draft damper is open or closed the check is moved to the opposite position. As will presently become apparent, the limit controller is in control of the damper motor either when it is operated to open position of the draft dampers in response to the manual knob or thermostat so that in the event of the furnace or boiler temperature rising to an unsafely high value the limit controller would cause the damper motor to operate the draft dampers back to closed position irrespective of the manual knob or the thermostat.

All of the elements associated with the control panel 50 are numbered the same as in previous figures. The operating circuits whereby the various operating functions are brought about will now be described. With the parts in the position shown, the thermostat is satisfied and the temperature of the furnace or boiler is such that the limit control switch 125 is engaging its associated contact and the switch arm 126 is disengaged from its associated contact. Upon a drop in space temperature to a predetermined value causing the blade 121 of thermostat 119 to engage the contact 122, a circuit will be completed for energizing motor 25 so as to operate the draft dampers to open position as follows: from secondary 118 of the transformer through a wire 130, terminal 80, contact strip 79, switch blade 65, limit switch 61, switch blade 64, bracket 82, contact strip 81, switch blade 69, contact 71, contact strip 78, terminal 75, wire 131, thermostatic element 120, blade 121, contact 122, wire 132, terminal 133 of the limit controller, wire 134, switch blade 125, contact 127, wire 135, terminal 136, wire 137, terminal 72, contact strip 83, terminal 84, wire 138, motor 25, wire 139, terminal 86, terminal 85, and wire 140 back to secondary 118. The motor 25 will now operate until the dampers have moved to a position wherein the draft damper is open, the limit switch 64 then being operated in the manner previously described by the lug 66 so as to interrupt the motor circuit leaving the dampers in the position to which they were operated. With the dampers in this position, normally, the space temperature will rise until the blade 121 of thermostat 119 engages the contact 123, at which time a circuit will be completed for the damper motor causing it to operate the damper in a manner to close the draft and open the check, this circuit being as follows: from secondary 118 through wire 130, terminal 80, contact strip 79, terminal 78, wire 141, terminal 142 of the limit controller, wire 143, terminal 144 of the limit controller, wire 145, contact 123, thermostatic blade 121, thermostatic element 120, wire 131, terminal 75, contact strip 78, contact 77, switch blade 69, contact strip 81, bracket 82, switch blade 62, the limit switch 60, switch blade 63, contact strip 83, terminal 84, wire 138, motor 25, wire 139, terminal 86, terminal 85, and wire 140 back to secondary winding 118. Upon completion of this circuit the motor will operate the dampers to closed position of the draft and open position of the check.

If it should be desired to operate the dampers to open position of the draft by means of the manual knob, the manual knob may be turned to the Open position as seen in Figure 3 so as to turn the switch arm 69 in a counterclockwise direction (as seen on Figure 7), thus bringing contact 70 into engagement with contact strip 77. This completes a circuit for the damper motor as follows: from secondary 118 through wire 130, terminal 80, contact strip 79, switch blade 65, limit switch 61, switch blade 64, bracket 82, contact strip 81, switch blade 69, contact 70, contact strip 77, terminal 73, wire 146, terminal 133, wire 134, switch blade 125, contact 127, wire 135, terminal 136, wire 137, terminal 72, contact strip 83, terminal 84, wire 138, motor 25, wire 139, terminal 86, terminal 85, and wire 140 back to secondary 118. Completion of this circuit will cause the damper motor to operate in a manner to move the draft to an open position and close the check. If a human operator desires to manually cause the dampers to be operated to closed position of the draft and open position of the check, he turns the manual knob to the Closed position as seen on Figure 3 which turns the switch arm 69 in a clockwise direction as seen on Figure 7 which positions the contact 71 into engagement with the contact strip 79 completing a circuit for the damper motor as follows: from secondary 118 through wire 130, terminal 80, contact strip 79, contact 71, switch blade 69, contact strip 81, bracket 82, switch blade 62, limit switch 60, switch blade 63, contact strip 83, terminal 84, wire 138, motor 25, wire 139, terminal 86, terminal 85, and wire 140 back to secondary 118. Upon completion of this circuit the motor operates the dampers as pointed out to closed position of the draft and open position of the check. If by accident the manual knob should be left in a position, as may often happen, wherein the draft damper is in an open position and the check is closed, that is, with the switch arm 69 in the position where the contact 70 engages the contact strip 77, it will be seen that the limit controller 174 remains effective to cause the damper motor to operate the dampers to closed position of the draft in the event that the furnace or boiler temperature should rise to an unsafely high value. Under these circumstances, as has already been described, switch blade 125 would disengage from its associated contact and the switch blade 126 would engage the contact 128 completing a circuit as follows: from secondary 118 through wire 130, terminal 80, contact strip 79, terminal 75, wire 141, terminal 142, wire 143, terminal 144, wire 147, contact 128, switch blade 126, wire 148, terminal 149 of the limit controller, wire 150, terminal 74, contact strip 81, bracket 82, switch blade 62, limit switch 60, switch blade 63, contact strip 83, terminal 84, wire 138, motor 25, wire 139, terminal 86, terminal 85, and wire 140 back to secondary 118. Completion of this circuit will cause the motor to operate the dampers to closed position of the draft and open position of the check. It is pointed out that the circuit last described is not dependent upon the switch blade 69 and that therefore whenever the switch blade 126 engages the contact 128, the said last described circuit will be completed to bring about a shut-down of the furnace or boiler as described. It will be understood also that the switch blade 125 disengages from its associated contact before the blade 126 engages contact 128 upon a rise in temperature so that under these circumstances it is impossible to complete a circuit through either the thermostat or the manual switch for causing the motor to operate in a manner to open the draft damper inasmuch as is apparent from the foregoing circuits as traced these particular thermostatic and manually controlled circuits extend through the limit switch formed by arm 125 and contact 127.

From the foregoing description it will be apparent to those skilled in the art that we have provided a novel control arrangement wherein the furnace dampers may be operated to any desired position either manually or automatically merely by making and breaking of contacts, and that when the dampers are operated either automatically or manually the limit controller remains in control and by means of its thermostatically made and open switches it may interrupt thermostatic and manual control of the damper motor, and furthermore may cause the damper motor to operate the dampers into closed position of the draft and open position of the check in the event that the furnace or boiler temperature rises to an unsafe value.

Those skilled in the art will appreciate the manifold utility and advantages of our improvements in the manner of forming and assembling the various parts of a motor operated device of the type disclosed. The entire assembly may be made substantially without tools and the use of riveting, welding or attaching parts by screws or bolts is almost entirely obviated. All of the individual parts and the assembly itself are of a nature to promote the utmost in ease of fabrication, assembly, and ultimate production. The entire system when installed is entirely safe although it provides everything desired in the way of convenience and dependability of control. Even though there may be negligence on the part of a human operative, the automatic controls are of such a nature as to preclude the possibility of dangerous heating conditions arising.

The embodiment of our invention which we have disclosed is representative of one of its preferred forms and is illustrative of various changes, modifications and devices therein which may be made by those skilled in the art. The invention is to be limited not by our disclosure but in accordance with the scope of the appended claims.

We claim as our invention:

1. In a motor operator assembly, in combination, a frame comprising spaced members, a motor and a reduction gear train, said gear train including shafts journalled in said spaced members, a housing for said assembly, a panel detachably secured to said frame and forming a part of said housing, said panel having switch means supported thereon, and means operable by said motor for actuating said switch means, said switch means comprising switch blades depending from said panel into engagement with said actuating means when said panel is in position.

2. In a motor frame, in combination, spaced members, spacing means for retaining said members in spaced relation, means forming hook and slot joints for locking said spaced members and spacing means together, a panel detachably secured to said frame, means forming tongue and groove joints whereby said frame and panel engage each other in a manner requiring movement of said panel in a given direction to disengage it from said frame, and means attaching said panel and said spacing means in a manner whereby said panel is prevented from moving in said given direction and said spacing means is prevented from moving in a direction to unlock itself from said spaced members.

3. In combination, an electric motor, a housing therefor, a control panel mounted on said housing for controlling said motor, means forming switches depending from said panel in a position wherein the switches are adapted to be actuated by said motor, said switches comprising metallic contact strips, electrical terminals on said panel formed integrally with said contact strips, and means comprising a manually operable switch blade constructed and arranged to be moved into and out of contact with one of said metallic contact strips.

4. In a damper motor assembly, in combination, a motor operator, a housing therefor comprising a base for said operator, a pair of sides, and means for attaching said sides to said base comprising tongue and slot connections, a top panel adapted to be engaged by said sides, and a second pair of sides having means adapting them to engage and be clipped to said first pair of sides and said top panel.

5. In combination, an electric motor, a housing therefor including a control panel forming a part thereof for controlling said motor, means forming switches depending from said panel in a position wherein the switches are adapted to be actuated by said motor, said switches comprising metallic contact strips, and electrical terminals on said panel connected to said contact strips.

6. In a motor operator assembly, in combination, a frame comprising spaced members, spacing means, hook and slot means releasably retaining said members and spacing means in locked engagement, a motor supported on the frame, a reduction gear train driven thereby and having shafts journalled in the members, a driven shaft, bearings for the driven shaft maintained in spaced relation thereon, and openings in the members for receiving the bearings, said members engaging said bearings when the members are locked in spaced relation.

7. In a motor operator assembly, in combination, a frame comprising spaced members and means releasably retaining said members in spaced relation, a motor supported on the frame, a reduction gear train driven thereby and having shafts journalled in the members, a driven shaft extending through the members, bearings for the driven shaft, a corresponding indentation in an edge of each member for receiving the shaft, said indentations terminating in enlarged openings for receiving said bearings when the members are locked in spaced relation, and said bearings serving to retain said driven shaft in said indentations.

8. In a motor operator assembly, in combination, a frame comprising spaced members and means releasably retaining said members in spaced relation, a shaft rotatably supported in said members, a corresponding indentation in an edge of each member for receiving the shaft, said indentations terminating in enlarged openings, and means carried by the shaft and receivable into said openings when the members are locked in spaced relation for retaining the shaft in said indentations.

9. In a motor operator assembly, in combination, a frame comprising spaced members and means releasably retaining said members in spaced relation, a shaft rotatably supported in said members, an indentation in an edge of at least one of said members for receiving the shaft, said indentation terminating in an enlarged opening, and means carried by the shaft and receivable into said opening when said members are locked in spaced relation for retaining the shaft in said indentation.

10. In a motor operator assembly, in combination, a frame comprising spaced members and means releasably retaining the members in spaced relation, a shaft rotatably supported in the members, bearings for the shaft maintained in spaced relation thereon, a corresponding indentation in an edge of each member for receiving the shaft, said indentations terminating in enlarged openings for receiving the bearings, said bearings retaining the shaft in position in the members when the same are locked in spaced relation, and said shaft and bearings being laterally removable from said members upon sufficient spreading thereof to first axially disengage said bearings therefrom.

11. A transformer and motor operator unit, comprising in combination, a transformer and housing therefor, and a motor operator comprising a frame detachably secured to said transformer housing, an electric motor supported on the frame, a panel secured to said frame for controlling the motor, and a housing for the motor operator including said transformer housing, said panel, first members secured to said panel and transformer housing, and second members secured to said panel and said first members.

12. In a motor operator assembly, in combination, an electric motor, a housing therefor, a motor frame within said housing, a control panel detachably secured to said frame and forming a part of said housing, electrical terminals on the outside surface of said panel for connections whereby said motor may be energized, switches attached to the inside surface of said panel and arranged in circuit with said motor, means actuable by said motor for operating said switches, a manual switch operator mounted on the outside of said panel, and connections between said manual switch operator and said terminals whereby said motor may be energized by actuation of said manual switch operator.

13. In a motor operator assembly, in combination, a frame comprising spaced members and means releasably retaining said members in spaced relation, a motor supported on the frame, a reduction gear train driven thereby and having shafts journalled in the members, a driven shaft, bearings for the driven shaft maintained in spaced relation thereon, said bearings having non-circular peripheries, and said members having openings conforming to said bearing peripheries for receiving the bearings upon relative movement of said shaft and member in a direction parallel to the axis of said shaft, said non-circular peripheries and openings preventing rotation of said bearings in said members when said bearings are received therein, and said retaining means being effective to maintain said members spaced in such relation that both said bearings are received in their respective openings.

SYLVANUS C. SHIPLEY.
WARD H. INGERSOLL.
BENJAMIN CYR.